Feb. 12, 1935.   E. H. BROWN ET AL   1,990,634
APPARATUS FOR CHARGING MOLDING POWDER
Filed Dec. 20, 1933
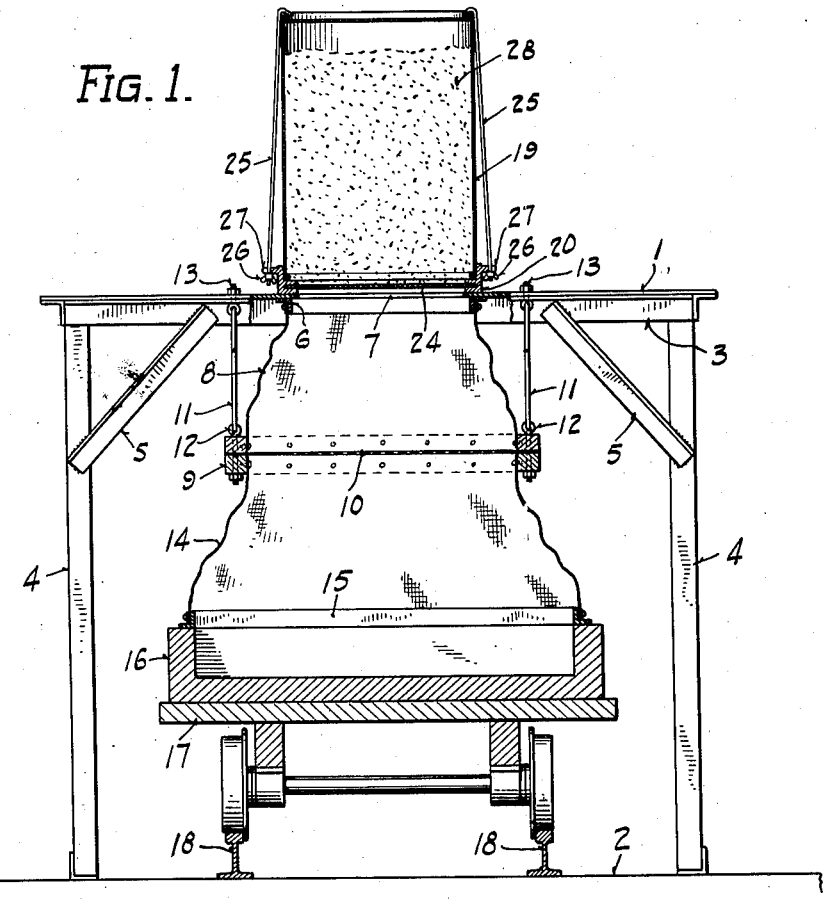
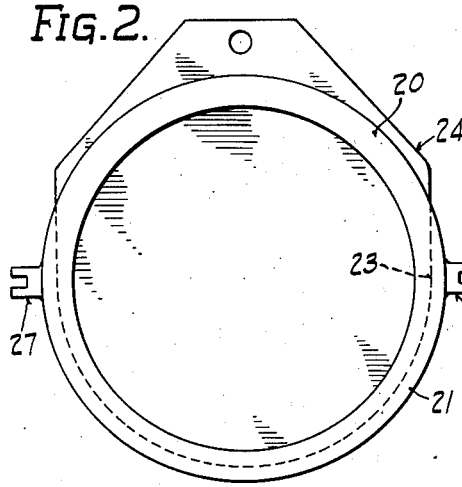
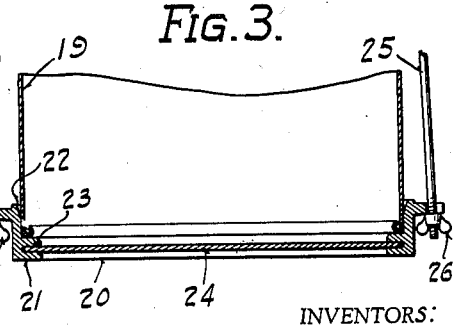
INVENTORS:
Edwin H. Brown
Adolph Pokras
Thomas C. Rathbone
BY
ATTORNEY.

UNITED STATES PATENT OFFICE 1,990,643

APPARATUS FOR CHARGING MOLDING POWDER

Edwin H. Brown, Wauwatosa, Adolph Pokras, Milwaukee, and Thomas C. Rathbone, Whitefish Bay, Wis., assignors to A. O. Smith Corporation, Milwaukee, Wis., a corporation of New York Application December 20, 1933, Serial No. 703,242

5 Claims. (Cl. 18—30)

This invention relates to the art of plastic molding, and more specifically, to an apparatus for charging a molding powder into the mold or die in which it is to be molded.

An object of the invention is to provide an apparatus which distributes the molding powder in the molding die and prevents loss of the finer material as dust.

A further object of the invention is to provide a charging station to which the molds are brought for filling and from which they are removed to the presses.

Other objects of the invention will be apparent from the following description and the accompanying drawing in which:

Figure 1 is a view, partly in elevation and partly in section, of an apparatus constructed in accordance with this invention;

Fig. 2 is a bottom plan view of the cover on the can in which the charge is weighed; and Fig. 3 is an enlarged fragmentary view of the cover and the can.

Referring to Fig. 1, a platform 1 is supported at a suitable distance above the floor 2 by means of a framework 3, vertical members 4, and diagonal braces 5. The platform 1 has a flange 6 on its lower face around a circular opening 7. The flange 6 is connected to the upper end of a canvas hood 8 which extends from the flange to a frame 9. This frame carries a screen or sieve 10, and is suspended from the platform 1 by means of tie rods 11 which are linked to eye bolts 12 in the frame 9 and eye bolts 13 in the platform. Due to the way in which it is suspended from the platform, the frame 9 can be moved freely in any direction in a horizontal plane.

Another canvas hood 14 extends from the lower section of the frame 9 to a frame 15 which may be constructed of angle iron. This member 15 is made of such size as to fit closely over a mold 16 into which the molding powder is to be charged. The mold may be conveniently supported on a truck 17 running on rails 18.

A can 19 is provided with a cover 20 having a valve over an opening of about the same size, or somewhat smaller, than the opening 7 in platform 1. The cover 20 consists of a circular member 21 with a tapered section 22 to facilitate the fitting of the cover to the can, and a groove 23 for the sliding plate 24 which serves as a valve. The cover 20 is secured in position by means of tie rods 25 extending to the bottom of the can, and nuts 26 which are screwed on the tie rods and bear on brackets 27 welded to the cover. The top of the cover is a plane surface so that it will fit closely to the plane surface of the platform 1 when the can is inverted thereon in the position shown in Fig. 1.

In using this apparatus the can 19 is removed from the charging platform and placed in an upright position to permit the introduction of the desired quantity of molding powder through the opening in the cover. The cover is then closed by means of the sliding plate 24 and the can is inverted on the platform 1 in the position shown in Fig. 1. The charge of molding powder 28 is retained in the can by the slide 24 which closes the cover. The mold is run into position beneath the charging platform by means of the truck 17, and the frame 15 on the lower end of the canvas hood 14 is placed on the upper surface of the mold 16. The frame 15 may conveniently be made of sufficient weight to retain it in position, or it may be secured to the mold by means of clamps which are not shown in the drawing. Withdrawal of the slide 24 allows the molding powder to fall to the screen 10 in the frame 9 which is then agitated to distribute the powder into the mold 16 in a layer of substantially uniform thickness. The agitation of the screen also serves to mix the molding powder and to break up any lumps or segregation of material which it may contain. The frame 15 is then lifted from the mold 16 and the truck 17 carrying the mold is run out from beneath the loading platform. Because of the canvas hoods 8 and 14 and the tight fit between the cover of the can and the platform, and between the frame 15 and the mold 16, there are no openings for the escape of dust. Consequently, there is no loss of the finer particles in the charge of molding powder, and no contamination of the atmosphere in the room in which the molds are charged.

While the molding powder is brought to the charging station in a can in the modification which has been described above, the invention is not limited to any specific method of delivering the molding powder to the charging station. The molding powder may equally well be brought to the charging station by a conduit leading to a hopper equipped to deliver a weighed amount of molding powder when desired. Various embodiments will be apparent to those skilled in the art and can be made without departing from the spirit of the invention.

We claim:

1. A device for charging molding powder into a mold which comprises a platform, an opening in the platform, a frame, a flexible dust-tight hood extending from the opening in the platform to the frame, a screen supported in the frame, an open frame adapted to rest on the mold into which the powder is to be charged, a flexible dust-tight hood extending between said frames, a receptacle in which the charge of molding powder is placed, a cover on said receptacle with an opening adapted to register with the opening in the platform when the receptacle is inverted thereover, and a valve in said cover adapted to discharge the contents of said receptacle when the valve is opened.

2. A device for charging moldable powder into a mold which comprises a platform, an opening in the platform, a frame, means for supporting said frame below said platform, a flexible dust-tight hood extending from the opening in the platform to the frame, a screen supported in the frame, an open frame adapted to rest on the mold into which the powder is to be charged, a flexible dust-tight hood extending between said frames, and means for discharging molding powder onto said screen through the opening in said platform.

3. In a device for charging molding powder into a mold, in combination, an open annular member with its upper surface adapted and arranged to form a tight fit with the cover of a receptacle when said cover is placed over the opening in said surface, a frame adapted to support a screen, a flexible dust-tight hood extending from the open annular member to the frame, a screen supported by the frame, a second frame with its lower surface adapted to form a tight fit with the upper surface of the mold into which the molding powder is to be charged, and a flexible dust-tight hood extending between said frames.

4. A device for charging molding powder into a mold which comprises a flexible dust-tight hood open at both ends, a frame fastened to the lower end of the flexible dust-tight hood, a screen supported by said frame, means for discharging molding powder onto said screen through the opening in the upper end of said flexible dust-tight hood, an open frame adapted to rest on the mold into which the powder is to be charged, and a flexible dust-tight hood extending from said open frame to the frame which supports the screen.

5. In a device for charging molding powder into a mold, in combination, a flexible dust-tight hood open at both ends, an open frame adapted to rest on the mold into which the molding powder is to be charged, said frame being secured to the lower end of said hood, and means positioned intermediate the length of said hood for distributing molding powder uniformly over the mold.

EDWIN H. BROWN.
ADOLPH POKRAS.
THOMAS C. RATHBONE.